(12) United States Patent
Maas et al.

(10) Patent No.: US 7,926,582 B2
(45) Date of Patent: *Apr. 19, 2011

(54) SOIL AERATION DEVICE

(75) Inventors: David R. Maas, Owatonna, MN (US);
Scott W. Bjorge, Owatonna, MN (US)

(73) Assignee: PlanetAir Turf Products, LLC,
Owatonna, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/827,570

(22) Filed: Jun. 30, 2010

(65) Prior Publication Data

US 2010/0263887 A1    Oct. 21, 2010

Related U.S. Application Data

(60) Continuation of application No. 11/861,880, filed on Sep. 26, 2007, now Pat. No. 7,784,557, which is a division of application No. 10/775,540, filed on Feb. 10, 2004, now Pat. No. 7,290,619, which is a continuation-in-part of application No. 10/638,953, filed on Aug. 11, 2003, now Pat. No. 7,055,617.

(51) Int. Cl.
*A01B 45/02* (2006.01)
(52) U.S. Cl. .......................... 172/21; 172/540
(58) Field of Classification Search .................... 172/21, 172/22, 540, 545, 546, 549, 550
See application file for complete search history.

(56) References Cited

U.S. PATENT DOCUMENTS

| | | | |
|---|---|---|---|
| 1,362,409 A | 12/1920 | Forker | |
| 1,704,986 A | 3/1929 | Marcy | |
| 1,965,510 A | 7/1934 | Porter | |
| 2,041,208 A | 5/1936 | Rienks | |
| 2,111,478 A | 3/1938 | McGuire | |
| 2,347,748 A | 5/1944 | Melling | |
| 2,591,572 A | 4/1952 | Mascaro | |
| 2,614,375 A * | 10/1952 | Calkins | ....................... 172/520 |
| 2,700,926 A | 2/1955 | Goit | |
| 2,778,291 A | 1/1957 | Kerns | |
| 3,143,090 A | 8/1964 | Cecil et al. | |
| 3,148,737 A | 9/1964 | Lunsford | |
| 3,393,751 A | 7/1968 | Mascaro | |
| 3,522,965 A | 8/1970 | Indzeoski | |
| 3,534,818 A | 10/1970 | Mascaro | |
| 3,586,109 A | 6/1971 | Eversole et al. | |
| 3,650,331 A | 3/1972 | Dedoes | |
| 3,707,132 A | 12/1972 | Hansen | |
| 3,797,577 A | 3/1974 | Killion et al. | |
| 3,877,401 A | 4/1975 | Gutman | |

(Continued)

OTHER PUBLICATIONS

PlanetAir Aerator, "Aerate, Mow, then Putt in just 15 minutes . . . ", Brochure, PlanetAir Turf Products, LLC—believed to have been publicly available before Aug. 11, 2003.

(Continued)

*Primary Examiner* — Thomas B Will
*Assistant Examiner* — Jamie L McGowan
(74) *Attorney, Agent, or Firm* — Fish & Richardson P.C.

(57) ABSTRACT

A soil aeration apparatus may include aeration tines that are actuated by a relatively compact gear system that reduces the size and weight of the apparatus. In addition, a soil aeration apparatus may operate without a centrally disposed support shaft, thus enabling the tine-holder shafts to be positioned closer to one another and reducing the size of the apparatus.

15 Claims, 12 Drawing Sheets

U.S. PATENT DOCUMENTS

| | | | |
|---|---|---|---|
| 3,939,917 A | 2/1976 | Reed, Jr. et al. |
| 3,993,143 A | 11/1976 | Moreland, Jr. |
| 4,020,907 A | 5/1977 | Luck |
| 4,081,034 A | 3/1978 | Hines |
| 4,084,642 A | 4/1978 | Killion |
| 4,148,362 A | 4/1979 | Orth |
| 4,154,305 A | 5/1979 | Prewett |
| 4,158,391 A | 6/1979 | Clements |
| 4,192,387 A | 3/1980 | Stinson |
| 4,212,357 A | 7/1980 | Clements et al. |
| RE30,705 E | 8/1981 | Hines |
| 4,326,591 A | 4/1982 | Dedoes |
| 4,336,760 A | 6/1982 | Cohen et al. |
| 4,383,580 A | 5/1983 | Huxford |
| 4,489,787 A | 12/1984 | Gary |
| 4,538,689 A | 9/1985 | Dietrich, Sr. |
| 4,550,783 A | 11/1985 | Hansen |
| 4,619,329 A | 10/1986 | Gorbett |
| 4,632,189 A | 12/1986 | Rizzo |
| 4,662,456 A | 5/1987 | Classen |
| 4,699,220 A | 10/1987 | Strohm |
| 4,723,607 A | 2/1988 | Hansen |
| 4,773,486 A | 9/1988 | Huber et al. |
| 4,776,404 A | 10/1988 | Rogers et al. |
| 4,791,995 A | 12/1988 | Hochlan, Jr. |
| 4,840,232 A | 6/1989 | Mayer |
| 4,867,244 A | 9/1989 | Cozine et al. |
| 4,881,602 A | 11/1989 | Hansen et al. |
| 4,899,828 A | 2/1990 | Harris |
| 4,910,948 A | 3/1990 | Nelson |
| 4,924,944 A | 5/1990 | Cozine et al. |
| 4,926,947 A | 5/1990 | Cozine et al. |
| 5,014,791 A | 5/1991 | Kure |
| 5,020,602 A | 6/1991 | Dellinger |
| 5,029,652 A | 7/1991 | Whitfield |
| 5,036,655 A | 8/1991 | Holloway |
| 5,069,293 A | 12/1991 | St. Romain |
| 5,101,910 A | 4/1992 | Dawson |
| 5,119,880 A | 6/1992 | Zehrung, Jr. et al. |
| 5,152,348 A | 10/1992 | Flanagan, Sr. et al. |
| 5,172,768 A | 12/1992 | Straus |
| 5,207,278 A | 5/1993 | Hatlen |
| 5,209,306 A | 5/1993 | Whitfield |
| 5,398,767 A | 3/1995 | Warke |
| 5,398,768 A | 3/1995 | Staples |
| 5,460,229 A | 10/1995 | Mattis |
| 5,469,922 A | 11/1995 | Bjorge |
| 5,495,895 A | 3/1996 | Sakamoto |
| 5,570,746 A | 11/1996 | Jones et al. |
| 5,579,847 A | 12/1996 | Postema |
| 5,586,603 A | 12/1996 | Mattis |
| 5,586,604 A | 12/1996 | Postema |
| 5,615,744 A | 4/1997 | Krafka |
| 5,623,996 A | 4/1997 | Postema |
| 5,662,172 A | 9/1997 | Brown |
| 5,673,756 A | 10/1997 | Classen |
| 5,680,903 A | 10/1997 | Oliver |
| 5,690,179 A | 11/1997 | Dickson |
| 5,709,272 A | 1/1998 | Jones et al. |
| 5,709,273 A | 1/1998 | Roth |
| 5,765,645 A | 6/1998 | Postema |
| 5,769,169 A | 6/1998 | Miksitz |
| 5,803,181 A | 9/1998 | Hsu |
| 5,806,293 A | 9/1998 | Klein et al. |
| 5,816,336 A | 10/1998 | Underhill |
| 5,823,269 A | 10/1998 | Leclerc |
| 5,868,206 A | 2/1999 | Miller |
| 5,906,090 A | 5/1999 | Knudsen |
| 5,934,055 A | 8/1999 | Steele |
| 5,937,953 A | 8/1999 | Melberg et al. |
| 6,003,612 A | 12/1999 | Knight et al. |
| 6,003,613 A | 12/1999 | Reincke |
| 6,038,989 A | 3/2000 | Comer et al. |
| 6,041,869 A | 3/2000 | Lewis et al. |
| 6,086,520 A | 7/2000 | Rodriquez |
| 6,102,129 A | 8/2000 | Classen |
| 6,149,169 A | 11/2000 | Chelgren |
| 6,179,061 B1 | 1/2001 | Fiore |
| 6,241,025 B1 | 6/2001 | Myers et al. |
| 6,273,197 B1 | 8/2001 | Marlow |
| 6,321,849 B1 | 11/2001 | Underhill |
| 6,415,872 B2 | 7/2002 | Myers et al. |
| 6,425,161 B1 | 7/2002 | LeMeur et al. |
| 6,460,318 B1 | 10/2002 | Ferris et al. |
| 6,484,811 B1 | 11/2002 | Edwards |
| 6,513,603 B2 | 2/2003 | Bjorge |
| 6,543,798 B2 | 4/2003 | Schaffner et al. |
| 6,659,190 B2 | 12/2003 | Jessen |
| 6,675,905 B2 | 1/2004 | Hill et al. |
| 6,684,960 B1 | 2/2004 | Ng et al. |
| 6,691,791 B2 | 2/2004 | Bjorge |
| 6,758,283 B2 | 7/2004 | Lauer et al. |
| 6,805,205 B1 | 10/2004 | Gabard |
| 6,983,806 B2 | 1/2006 | Bjorge |
| 7,055,617 B2 | 6/2006 | Bjorge et al. |
| 7,070,005 B2 | 7/2006 | Maas |
| 7,096,968 B2 | 8/2006 | Maas |
| 7,152,691 B2 | 12/2006 | Maas et al. |
| 7,204,317 B2 | 4/2007 | Maas et al. |
| 7,290,619 B2 | 11/2007 | Maas et al. |
| 2003/0230417 A1 | 12/2003 | Maas |
| 2006/0027381 A1 | 2/2006 | Bjorge et al. |
| 2006/0037762 A1 | 2/2006 | Maas |
| 2008/0011493 A1* | 1/2008 | Maas et al. ............ 172/22 |

OTHER PUBLICATIONS

PlanetAir Aerator, "Innovation that improves and protects your piece of the planet . . . ," Brochure, PlanetAir Turf Products, LLC—believed to have been publicly available before Aug. 11, 2003.

PlanetAir Aerator, "Aerate. Mow. Play.", Brochure, PlanetAir Turf Products, LLC—believed to have been publicly available before Aug. 11, 2003.

* cited by examiner

SOIL AERATION DEVICE

RELATED APPLICATION

This application is a continuation of U.S. patent application Ser. No. 11/861,880 filed on Sep. 26, 2007 by David Maas et al. and entitled "Soil Aeration Device" now U.S. Pat. No. 7,784,557), which is a division of U.S. patent application Ser. No. 10/775,540 filed on Feb. 10, 2004 by David Maas et al. and entitled "Soil Aeration Device" (now U.S. Pat. No. 7,290,619), which is a continuation-in-part of U.S. patent application Ser. No. 10/638,953 filed on Aug. 11, 2003 by David Maas et al. and entitled "Soil Aerator" (now U.S. Pat. No. 7,055,617). The entire contents of these earlier documents are incorporated herein by reference.

BACKGROUND

Soil aeration is a conventional technique used by groundskeepers to reduce compaction in the ground soil, stimulate plant growth, and promote proper drainage. Soils may become compacted from overuse or environmental effects, which ultimately affects the soil permeability and development of rooted plants within the soil. In particular, compacted soil restricts the amount of oxygen that can enter the soil and the amount of carbon dioxide that can escape. Not all grounds are affected equally by overuse and environmental factors. The amount of compaction depends soil texture, the amount of vegetation, and the moisture content of the soil. Periodic soil aeration relieves the compaction in the soil before the negative effects overburden the soil to the point that it can no longer support desirable vegetation.

In general, soil aerators have aeration tubes that penetrate the ground and remove "plugs" of soil. The aeration tubes are typically carried on bars or racks that are affixed to a rotary member. The rotor, racks, and associated gear hardware are typically large, bulky, and heavy. The overall dimensions and weight of the aeration device are accordingly increased. That, in turn, necessitates the use of relatively large tractors with large displacement engines. Consequently, most aeration devices are expensive to operate and ill-suited for residential, light commercial, or rental use.

SUMMARY

A soil aeration apparatus may include aeration tines that are actuated by a relatively compact gear system, which reduces the size and weight of the aeration apparatus. In an illustrative embodiment, a soil aeration apparatus includes at least two tine-holder shafts rotatably mounted to a carrier and aeration tines attached to each shaft. The apparatus may also include a gear system for rotating the tine-holder shafts while the tine-holder shafts revolve about a central axis of the carrier. The gear system may have a planetary gear coupled to each tine-holder shaft and a sun gear axially aligned with the central axis such that each sun gear engages a plurality of planetary gears.

In various embodiments, a soil aeration apparatus may operate without a centrally disposed support shaft, thus enabling the tine-holder shafts to be positioned closer to one another and reducing the size of the apparatus. In one illustrative embodiment, a soil aeration apparatus may include a carrier rotatably attached to a frame such that the carrier is rotatable about a central axis. The apparatus may also include first and second two tine-holder shafts rotatably mounted to the carrier and aeration tines attached to each shaft. A non-centrally located support shaft may be coupled to the carrier and offset from the central axis and mounted to the carrier. The first and second shafts may be offset from the central axis such that the tines are operative to move through the central axis without interference from another tine or shaft.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
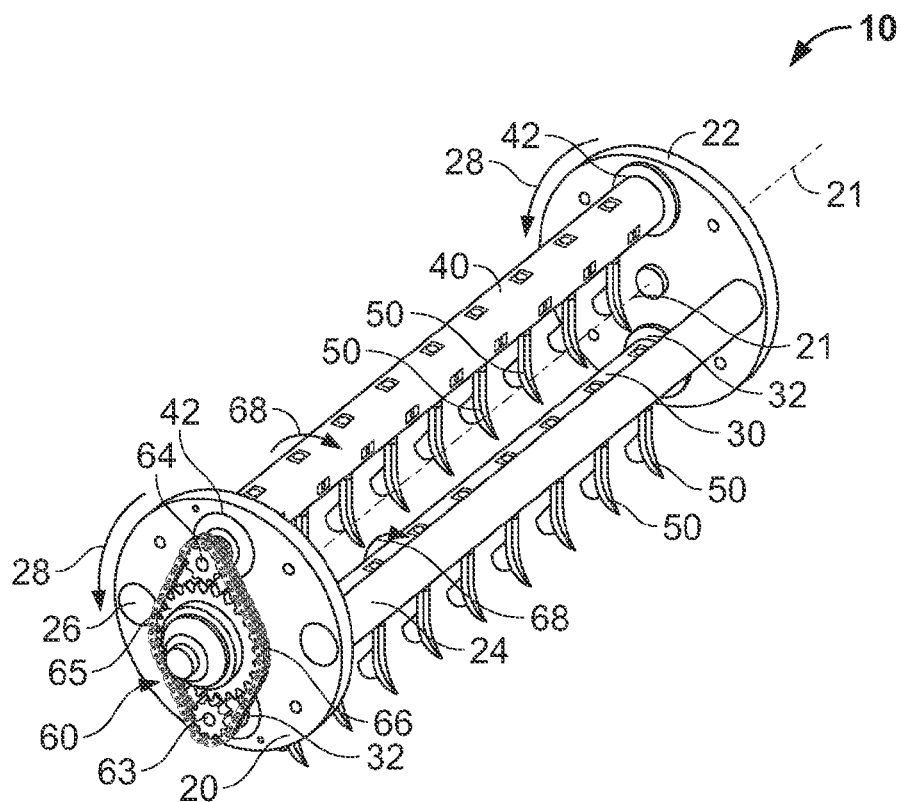
FIG. 1 is a perspective view of a soil aeration apparatus in accordance with an embodiment of the invention.

Referring to FIG. 1, a soil aeration apparatus 10 includes two tine-holder shafts 30 and 40 extending between opposing carriers 20 and 22. The shafts 30 and 40 are rotatably mounted to the carriers 20 and 22 such that each shaft may rotate 68 about its own axis. The shafts 30 and 40 are positioned substantially parallel in the axial direction, and soil aeration tines 50 extend from each shaft 30 and 40 in the radial direction. The soil aeration tines 50 may penetrate and remove a portion of soil from a ground surface as is taught, for example, in U.S. Pat. No. 6,513,603 issued to Bjorge on Feb. 4, 2003, the contents of which are herein incorporation by reference. Two non-centrally located support shafts 24 and 26 also extend between the opposing carriers 20 and 22. The support shafts 24 and 26 are fixedly mounted to the carriers 20 and 22 and provide mechanical support for the soil aeration apparatus 10 when in operation. A gear system 60 is engaged with the tine-holder shafts 30 and 40 to cause rotation of the tine-holder shafts 30 and 40. The gear system 60 has a plurality of planetary gears 63 and 64 for each sun gear 65. Each shaft 30 or 40 has a planetary gear 63 or 64 attached thereto. In this embodiment, the sun gear 65 is positioned between the planetary gears 63 and 64 and is engaged with the planetary gears 63 and 64 using a drive chain 66. Because a plurality of planetary gears 63 and 64 are operated using an individual sun gear 65, the bulkiness of the gear system 60 is advantageously reduced. Furthermore, because the apparatus 10 does not use a centrally located support shaft, the tine-holder shafts 30 and 40 may be positioned closer to one another, thus reducing the overall size of the apparatus 10.

Referring to FIG. 1 in more detail, bearings 32 and 42 may be used to rotatably mount the shafts 30 and 40, respectively, to the carriers 20 and 22. The bearings 32 and 42 may comprise ball bearings, roller bearings, or bushings, and may provide access for a portion of the shafts 30 and 40 to extend through the carriers 20 and 22. The planetary gear 63 is axially aligned with the shaft 30 and fixedly mounted to the portion of the shaft 30 on the outer side of the carrier 20. Similarly, the planetary gear 64 is axially aligned with the shaft 40 and mounted to the portion of the shaft extending through the carrier 20. In this embodiment, the planetary gears 63 and 64 are radially aligned with the sun gear 65 such that a single drive chain 66 is engaged with all three gears 63, 64, and 65. Briefly describing the operation of the gear system 60, the carriers 20 and 22 are motivated to rotate about a central axis 21 using a drive means (not shown in FIG. 1). The sun gear 65 is axially aligned with the central axis 21 but remains substantially fixed with respect to the central axis as the carriers 20 and 22 rotate. When the carriers 20 and 22 rotate, the tine-holder shafts 30 and 40 are caused to revolve around the central axis 21. Likewise, the planetary gears 63 and 64 also revolve around the central axis 21. As such, the planetary gears 63 and 64 revolve about the sun gear 65 in a direction 28 as the drive chain 66 causes the planetary gears 63 and 64 to rotate in a direction 68. The motion of revolving 28 the shaft 30 or 40 about the central axis 21 while rotating 68 the shaft 30 or 40 about its own axis causes the desired motion of the tines 50 to penetrate and remove a portion of soil from the ground surface.

Still referring to FIG. 1, the support shafts 24 and 26 are positioned between the carriers 20 and 22 and fixedly mounted to near the perimeter of each carrier 20 and 22. Because the support shafts 24 and 26 are non-centrally located (e.g., offset from the central axis 21), tine-holder shafts 30 and 40 may be positioned closer to the central axis 21 without interference from the tines 50 hitting a centrally located shaft. Rather, the tine-holder shafts 30 and 40 may rotate in the direction 68 as the tines 50 pass through the central axis 21 without interference. The compact arrangement of shafts 30, 40, 24, and 26 advantageously reduces the overall size of the soil aeration apparatus 10 in comparison to other apparatus that require the tine-holder shafts 30 and 40 to be spaced apart for clearance between the revolving tines 50 and a centrally located support shaft.

Figure 2:
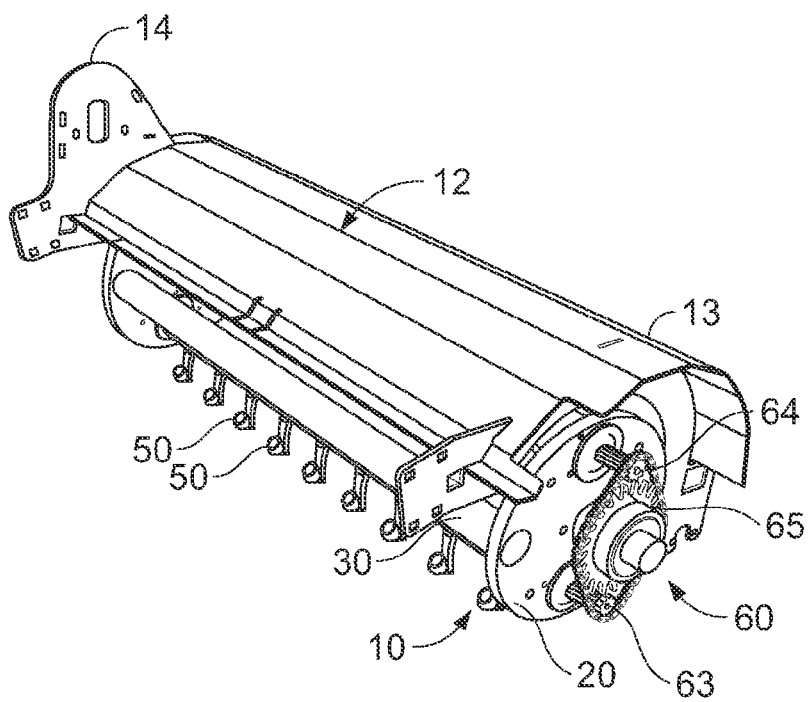
FIG. 2 is a perspective view of a frame for housing the soil aeration apparatus of FIG. 1, with certain components of the frame removed.

Referring to FIG. 2, the soil aeration apparatus 10 may be installed in a frame 12. The frame 12 may have a safety panel 13 to prevent damage to the tine-holder shafts 30 and 40 from debris and to protect a user from the moving tines 50 and tine-holder shafts 30 and 40. The frame 12 may also include side panels 14 to protect the gear system 60 from debris. In the embodiment shown in FIG. 2, one side panel 14 is removed to better show the soil aeration apparatus within the frame 12. Optionally, the sun gear 65 may be attached to the side panel 14 (removed from the view show in FIG. 2) to maintain the sun gear 65 in a substantially fixed relationship with respect to the central axis 21. The carriers 20 and 22 may be rotatably attached to the side panels 14 or other part of the frame 12 such that the carriers 20 and 22 may rotate about the central axis 21 while the frame 12 remains substantially fixed with respect to the central axis 21. A set of wheels (not shown in FIG. 2) may be connected to the side panels 14 or other part of the frame 12. Additionally, the frame may include other components that enable the frame 12 to be attached to a tractor or other vehicle.

Figure 3:
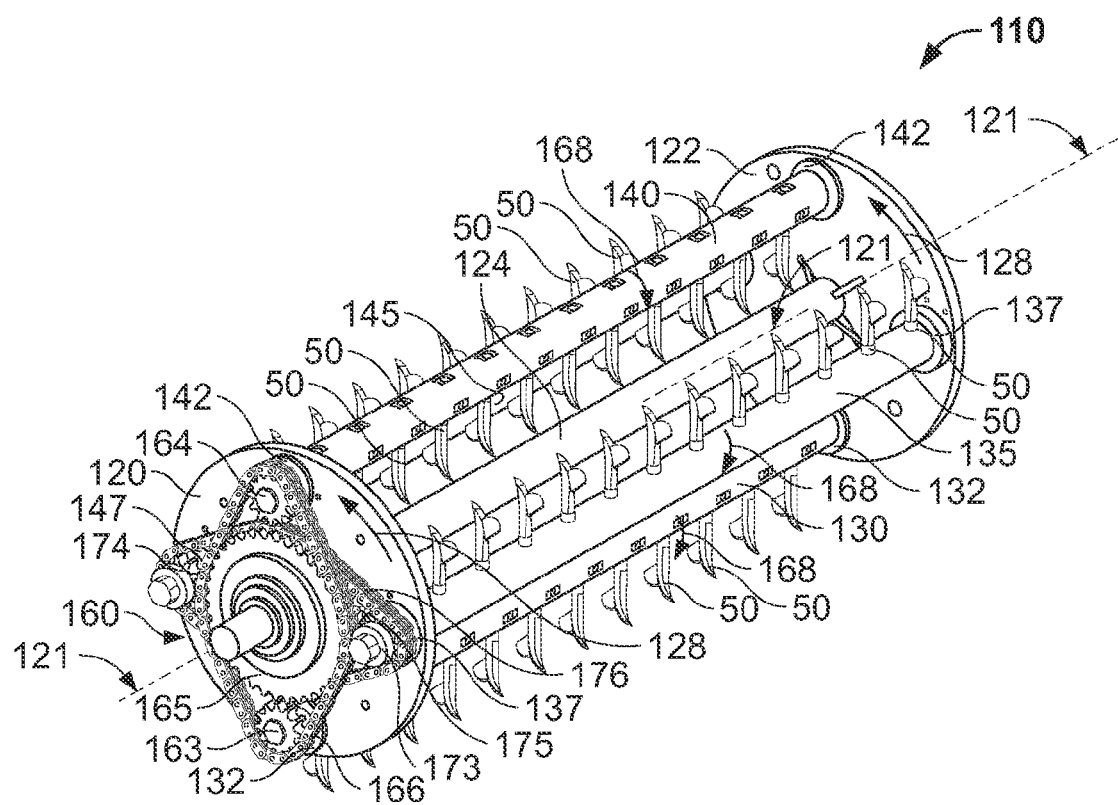
FIG. 3 is a perspective view of a soil aeration apparatus in accordance with another embodiment of the invention.

Referring to FIG. 3, another embodiment of a soil aeration apparatus 110 includes four tine-holder shafts 130, 135, 140, and 145 extending between two carriers 120 and 122. Soil aeration tines 50 extend in a substantially radial direction from each shaft 130, 135, 140, and 145 and are capable of penetrating and removing a portion of soil from the ground surface. The shafts 130, 135, 140, and 145 extend substantially parallel to one another in the axial direction between the carriers 120 and 122. The shafts 130, 135, 140, and 145 are rotatably mounted to the carriers 120 and 122 using bearings 132, 137, 142, and 147, respectively. As such, each tine-holder shaft 130, 135, 140, or 145 may rotate about its own axis in a direction 168 while all the shafts 130, 135, 140, and 145 revolve in a direction 128 around a central axis 121. The bearings 132, 137, 142, and 147 may comprise ball bearings, roller bearings, or bushings, and may provide access for a portion of the shafts 130, 135, 140, and 145 to extend through the carriers 120 and 122.

Figure 4:
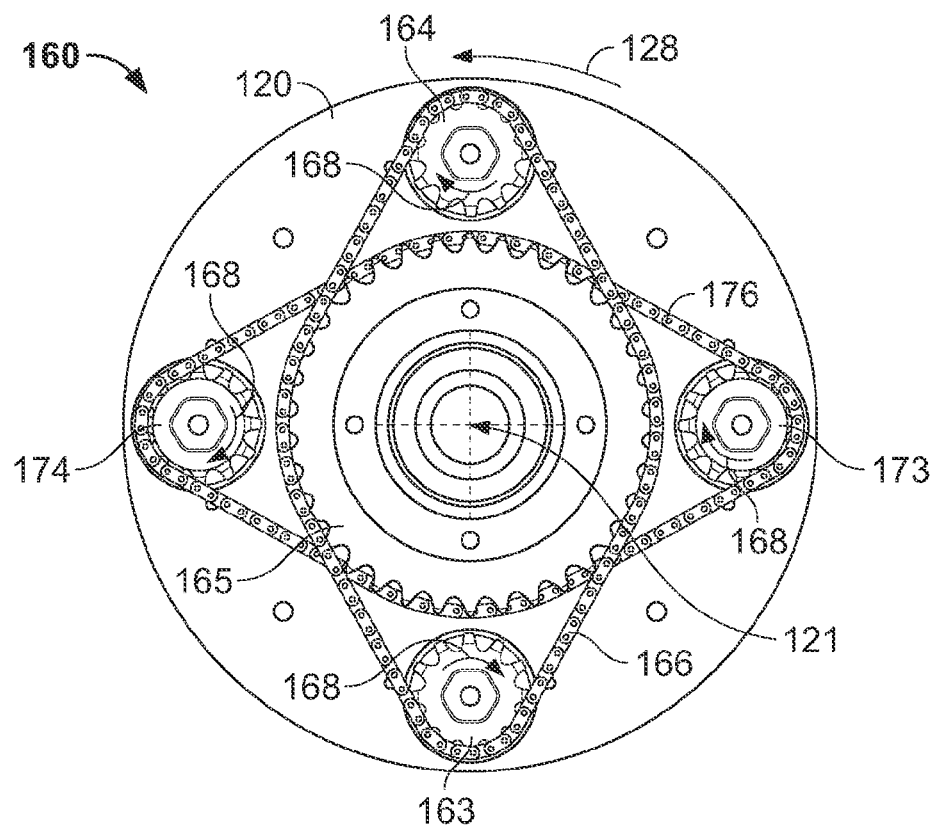
FIG. 4 is a side view of the soil aeration apparatus of FIG. 3.

Referring to FIGS. 3 and 4, the soil aeration apparatus 110 includes a gear system 160 having a plurality of planetary gears 163, 164 (or 173, 174) for each sun gear 165 (or 175). In this embodiment, planetary gears 163 and 164 interact with sun gear 165. Planetary gear 163 is axially aligned with and fixedly mounted to tine-holder shaft 130. Likewise, planetary gear 164 is axially aligned with and fixedly mounted to tine-holder shaft 140. The sun gear 165 is axially aligned with the central axis 121 but remains substantially fixed with respect to the central axis 121 as the carriers 120 and 122 rotate about the central axis 121. A drive chain 166 is engaged with the sun gear 165 and the corresponding planetary gears 163 and 164, which causes the planetary gears 163 and 164 to rotate in the direction 168 as the planetary gears 163 and 164 revolve about the sun gear 165 in the direction 128. This rotational 168 and revolving 128 motion of the planetary gears 163 and 164 causes the tine-holder shafts 130 and 140 to move in a desired path for penetrating and removing portions soil from the ground surface. Planetary gears 173 and 174 interact with sun gear 175 by way of a drive chain 176 in a manner similar to that of sun gear 165 and planetary gears 163 and 164. The interaction of planetary gears 173 and 174 with the sun gear 175 causes the tine-holder shafts 135 and 145 to have a rotational 168 and revolving 128 motion similar to that of tine-holder shafts 130 and 140. The gear system 160 provides the desired motion of the tine-holder shafts 130, 135, 140, and 145 without using individual sun gear and planetary gear for each tine-holder shaft (e.g., four tine-holder shafts, four sun gears, and four planetary gears). Rather, the gear system 160 operates a plurality of planetary gears from each sun gear, which advantageously reduces the bulkiness of the gear system of the soil aeration apparatus.

Figure 5:
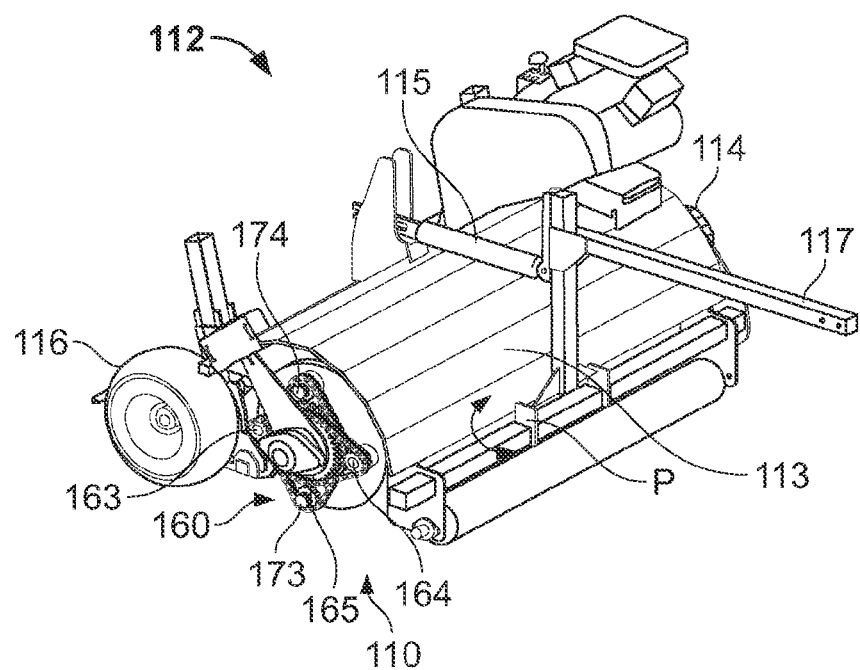
FIG. 5 is a perspective view of a frame for housing the soil aeration apparatus of FIG. 4, with a side panel removed from the frame.

Referring to FIG. 5, the soil aeration apparatus 110 may be installed in a frame 112 that transports the apparatus over a ground surface. The frame may include a safety panel 113 and side panels 114, as previously described in connection with FIG. 2. In this embodiment, a side panel 114 is removed to better show the soil aeration apparatus 110 housed in the frame 112. In addition, the frame may include wheels 116 and a connection means 117 so that the frame 112 may be attached to a tractor or other vehicle and moved over the ground surface, for example, as described in connection with FIGS. 13-15. The frame 112 may also include a lifting device 115, such as a pneumatic or hydraulic cylinder, to lift the soil aeration apparatus 110 from the ground surface while the frame is turning or moving over a non-soil surface. For example, while the connection means is attached to a vehicle, the cylinder 115 may be actuated to extend the cylinder piston, thereby causing the frame 112 to revolve counterclockwise about a pivot axis P. Such cylinder actuation will cause the soil aeration apparatus 110 to lift from the ground surface as the frame 112 rocks back on to the wheels 116.

Briefly referring again to FIG. 3, the soil aeration apparatus 110 may include a support shaft 124 along the central axis 121. This support shaft 124 provides mechanical stability for the soil aeration apparatus 110 when in operation. Optionally, the soil aeration apparatus 110 may operate without a centrally located support shaft 124. For example, the tine-holder shafts 130, 135, 140, and 145 may be rotatably mounted to the carriers 120 and 122 so as to provide sufficient mechanical stability for the soil aeration apparatus 110 without the need for the support shaft 124. In such a case, the tine-holder shafts 130, 135, 140, and 145 would also serve as non-centrally located support shafts.

Figure 6:
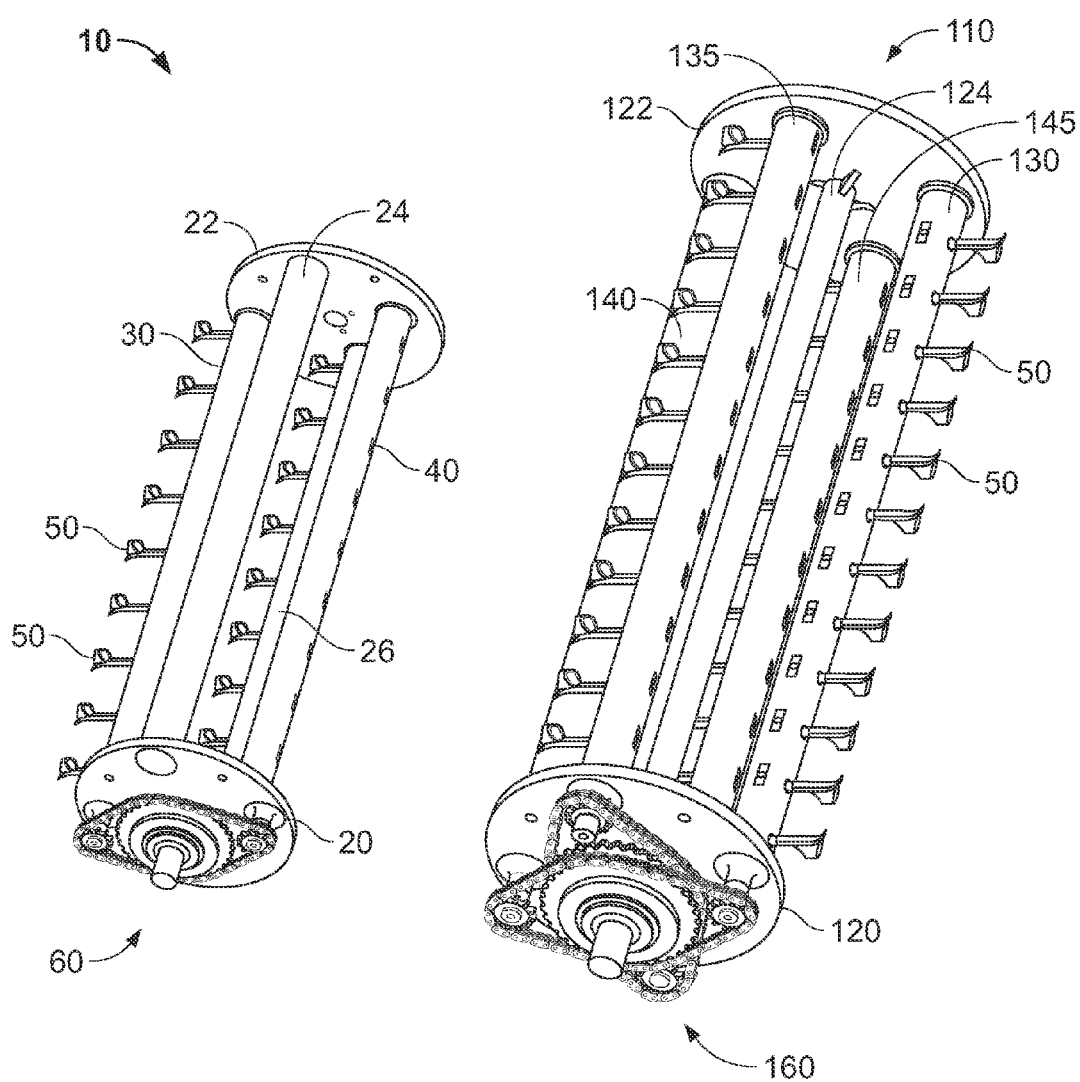
FIG. 6 is a perspective view of the soil aeration apparatus of FIG. 1 and the soil aeration apparatus of FIG. 3.

Referring now to FIG. 6, the size of the soil aeration apparatus may be advantageously reduced by eliminating the centrally located support shaft. The soil aeration apparatus 10 (also shown in FIG. 1) includes non-centrally located support shafts 24 and 26. As such, the tine-holder shafts 30 and 40 may be positioned closer to the central axis 21 without the need for clearance space for the tines 50. The tines 50 on one shaft 30 may be staggered from tines 50 on another shaft 40 such that the tines 50 may revolve about the tine-holder shaft 30 without interference from other tines 50. In certain embodiments, there may be a need for mechanical support from a centrally located support shaft 124. In such cases, the tine-holder shafts may be sufficiently spaced apart such that the tines 50 may revolve about one tine-holder shaft without interference from a centrally located support shaft or a neighboring tine-holder shaft. For example, the soil aeration apparatus 110 (also shown in FIG. 3) includes a centrally located support shaft 124 and tine-holder shafts 130, 135, 140, and 145 that are spaced apart to provide clearance for the tines 50. The size of the soil aeration apparatus 110 may be reduced, however, if the centrally located support shaft 124 is eliminated and the tine-holder shafts are positioned closer to one another.

Figure 7A:
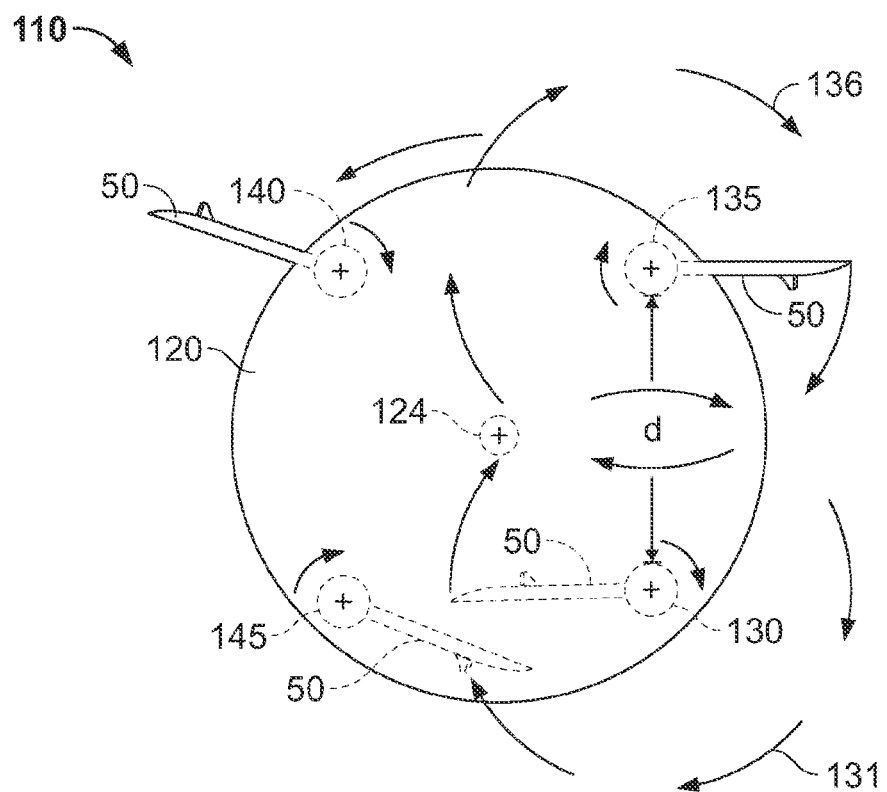
FIG. 7A is a side view of the carrier, shafts, and tines of the soil aeration apparatus of FIG. 3, in accordance with an embodiment of the invention.
Figure 7B:
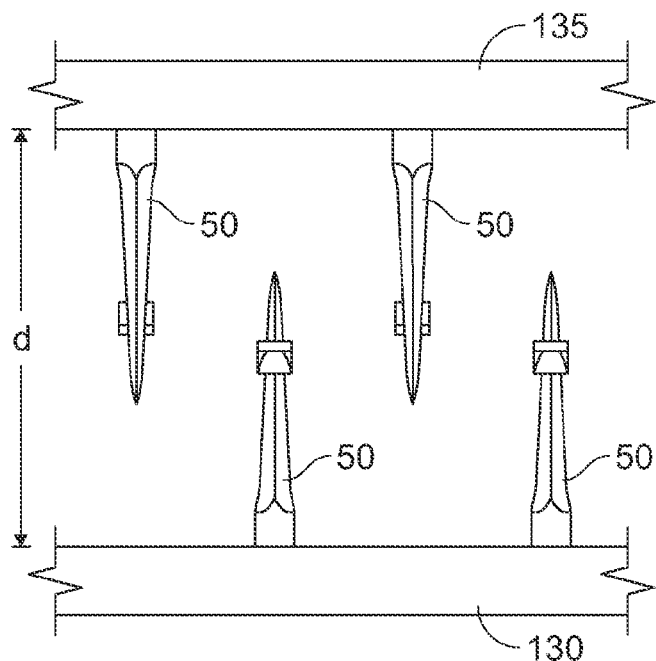
FIG. 7B is a front view of a portion of the shafts and tines of the soil aeration apparatus of FIG. 7A.

As explained above, the size of the soil aeration apparatus 110 may be reduced if the tines 50 on one shaft 130 are staggered from tines 50 on another shaft 135. Referring to FIGS. 7A-B, the soil aeration apparatus 110 may include tine-holder shafts 130, 135, 140, and 145 that are positioned closer to the centrally located support shaft 124 (providing only minimal clearance between the support shaft 124 and the path of revolution of each tine 50). By positioning the shafts 130, 135, 140, and 145 closer to the central axis, the shafts are likewise positioned closer to one another. In this example, the shafts 130 and 135 are attached to the carrier 120 and separated by a distance d while the tines 50 extend more than half the distance d in a radial direction from the shafts 130 and 135.

As shown in FIG. 7A, the closer positioning of the shafts 130, 135, 140, and 145 may cause the motion path 131 of the tines 50 on shaft 130 to overlap the motion path 136 of the tines 50 on the neighboring shaft 135. However, the tines 50 on shaft 130 are in a staggered position (shown in FIG. 1 and in FIG. 7B) relative to tines 50 on neighboring shaft 135. The staggered positioning permits the tines 50 to revolve about the tine-holder shaft 130 without interference from tines 50 on other shafts (e.g., shaft 135). The tine-holder shafts 130, 135, 140, and 145 thus may be positioned closer to the centrally located support shaft 124 without the potential for interference between the revolving tines 50, thereby permitting the carrier 120 and frame 112 to have smaller dimensions and less weight. Alternatively, a soil aeration apparatus incorporate staggered tines without a centrally located support shaft, similar to the embodiment described in connection with FIG. 1, thereby permitted the carrier 120 and frame 112 to be further reduced in dimension and weight.

In operation, the soil aeration apparatus 10 or 110 may be attached to a frame 12 or 112 that guides the apparatus 10 or 110 over a ground surface. In some embodiments, the frame may be attachable to a tractor or other vehicle such that the apparatus is towed behind the vehicle over a ground surface. In other embodiments, the frame is configured to be manually pushed by a user over the ground surface. A drive means, such as a spinning drive shaft that causes the carriers to rotate, may be attached to the frame 12 or 112 and the soil aeration apparatus 10 or 110 to produce the desired revolving and rotation motion of the planetary gears and the tine-holder shafts. Alternatively, the drive means may comprise the carrier 20 or 120 being forced to rotate as it rolls along the ground surface.

Figure 8A:
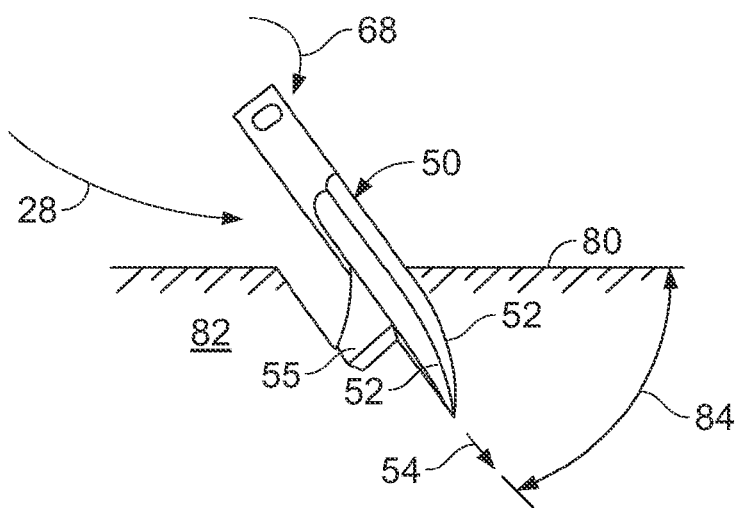
FIGS. 8A-C are side views of a soil aeration tine forming an aeration pocket in accordance with an embodiment of the invention.
Figure 8B:
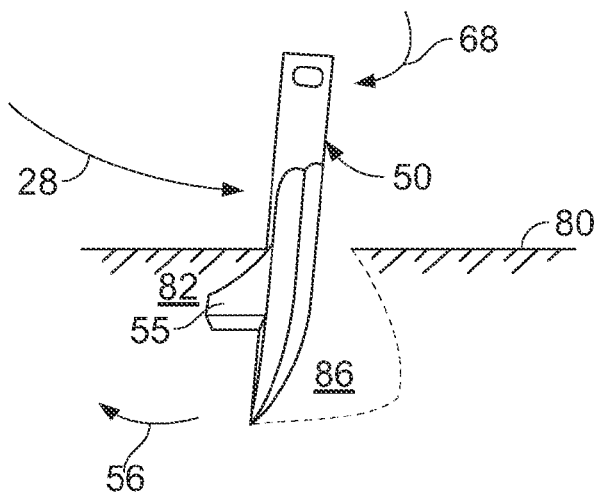
Figure 8C:
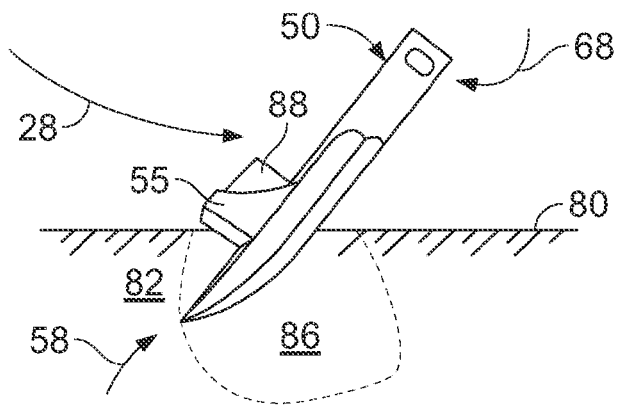

Referring to FIGS. 8A-C, the soil aeration tines 50 may operate to penetrate a ground surface 80 and remove a portion of soil 82. The interaction of the gear system 60 and the tine-holder shafts 30 and 40 causes the revolving 28 and rotation 68 motions of the tine-holder shafts 30 and 40, which in turn, causes the desired motion of the individual tines 50. Notably, the direction of rotation 68 and the direction revolution 28 may be different from that depicted in FIGS. 8A-C, depending on a number of factors, such as the type of aeration tine 50 used with the soil aeration apparatus 10. (The operation of the soil aeration tines 50 is described with respect to the embodiment of the soil aeration apparatus 10 and gear system 60 of FIG. 1, but it is understood that the description also applies to other embodiments of the soil aeration apparatus, such as the embodiment shown in FIG. 3.) The gear system 60 is configured to orient the tine 50 at an acute angle to the ground surface 80 when the tine-holder shaft 30 is revolved 28 around the center axis 21 to a point near the ground surface 80.

Referring to FIG. 8A, the soil aeration tine 50 penetrates a patch of soil 82 at an acute angle 84 with respect to the ground surface 80. In this embodiment, one or more soil fracturing surfaces 52 on the tine 50 penetrate the soil at an acute angle, which causes the soil proximate the aeration tine 50 to fracture upward rather than compact. Referring to FIG. 8B, even though the tine-holder shaft 30 continues to revolve 28 around the central axis 21, the soil aeration tine 50 is rotated 68 by the motion of the planetary gear 63 attached to the tine-holder shaft 30. The sweeping action 56 from the revolving 28 and rotational 68 motions forms an aeration pocket 86 in the region penetrated by the soil aeration tine 50. As shown in FIG. 8C, the tine-holder shaft 30 continues to revolve 28 around the central axis 21, which causes the tine 50 to be pulled from the soil 82 even as the tine 50 continues to rotate 68. The removal action 58 from the revolving 28 and rotational 68 motions completes the formation of the aeration pocket 86. In this embodiment, the tine 50 includes a cutting tube 55 that cuts and removes a plug 88 of soil 82 during the sweeping 56 and removal 58 actions. The penetration 54, sweeping 56, and removal 58 actions are repeated as the subsequent tine-holder shaft 40 is revolved 28 near the ground surface 80 and the corresponding planetary gear 64 causes the tines 50 to be oriented at an acute angle to the ground surface 80.

Figure 9:
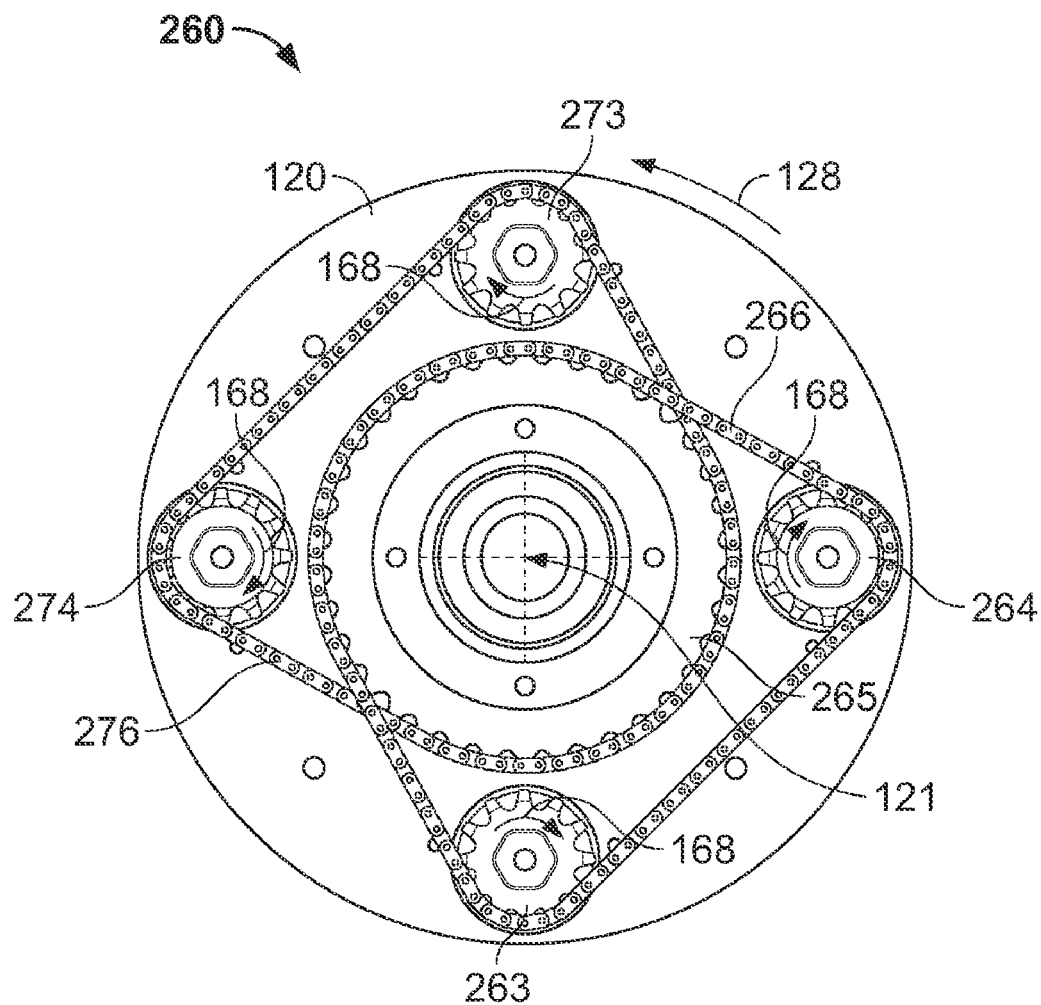
FIG. 9 is a side view of the soil aeration apparatus of FIG. 3 in accordance with another embodiment of the invention.

Various embodiments of the gear system for the soil aeration apparatus 110 may be used to advantageously reduce the bulkiness of the apparatus 110. Referring to FIG. 9, a gear system 260 may be implemented to cause the desired motion of the tine-holder shafts 130, 135, 140, and 145. In this embodiment, sun gear 265 is aligned with the central axis 121 and remains substantially fixed with respect to the central axis 121 even as the carrier 120 rotates about the central axis 121. The sun gear 265 is not necessarily positioned between the planetary gears 263 and 264, yet the gears 263, 264, and 265 are radially aligned so that the drive chain 266 may engage the gears 263, 264, and 265. Similarly, planetary gears 273 and 274 interact with another sun gear (positioned behind the first sun gear 265 and not shown in FIG. 9) that is axially aligned with the central axis 121. Alternatively, the drive chains 266 and 276 may engage the same sun gear 265, depending on the axial thickness of the sun gear 265 and the type of drive chain. As shown in FIG. 9, while the planetary gears 263, 264, 273, and 274 move around the corresponding sun gears in the direction of revolution 128, each planetary gear 263, 264, 273, or 274 is caused to rotate about its own axis in the direction of rotation 168. Because each sun gear is used to operate a plurality of planetary gears (rather than a one-to-one correspondence), the bulkiness of the soil aeration apparatus and gear system may be reduced.

Figure 10:
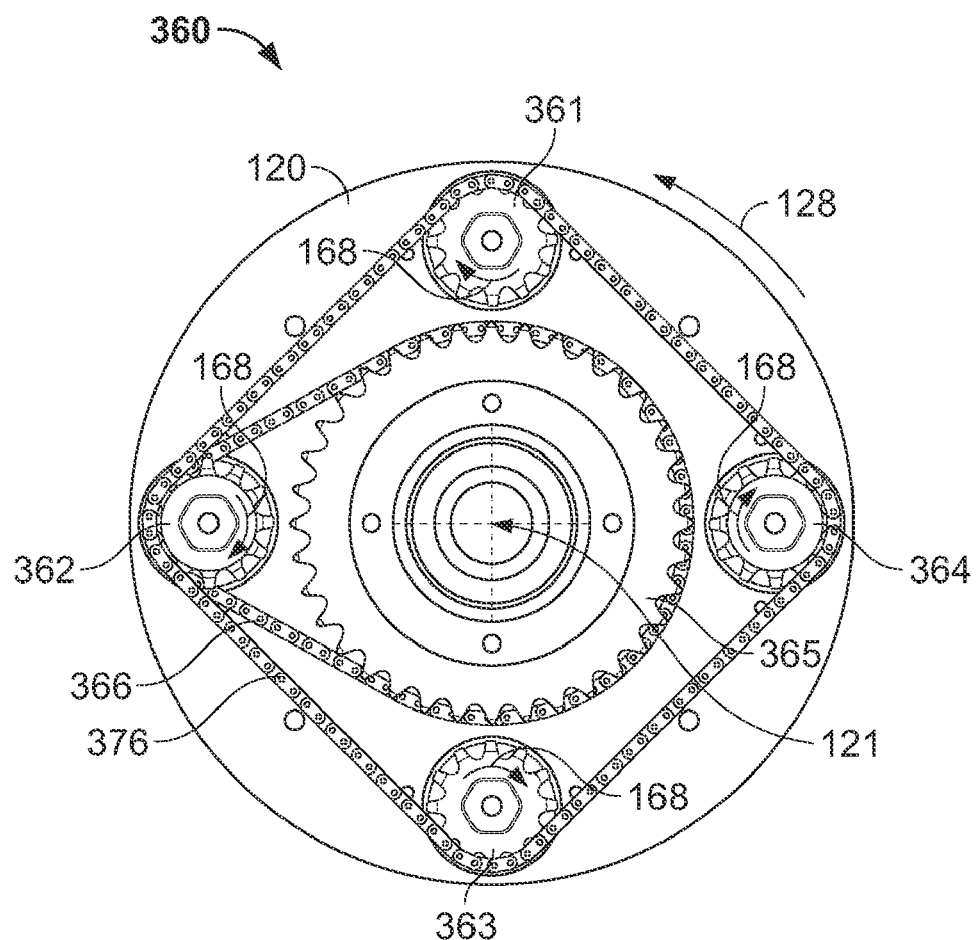
FIG. 10 is a side view of the soil aeration apparatus of FIG. 3 in accordance with yet another embodiment of the invention.

In another embodiment, the gear system may include planetary gears that are indirectly engaged with a sun gear. Referring to FIG. 10, a drive chain 366 engages a first planetary gear 362 and a sun gear 365. A secondary drive chain 376 is engaged with the first planetary gear 362 and other planetary gears 361, 363, and 364, but not with the sun gear 365. The sun gear is axially aligned with the central axis 121 and remains substantially fixed with respect to the central axis 121 even as the carrier 120 rotates about the central axis 121. When the carrier 120 rotates about the central axis 121, the planetary gears 361, 362, 363, and 364 revolve around the sun gear 365 in the direction 128. The drive chain 366 causes the planetary gear 363 to rotate about its own axis in the direction 168. This rotation of planetary gear 362 causes the drive chain 376 to rotate the other planetary gears 361, 363, and 364 in the same rotational direction 168. As such, the more compact gear system 360 drives four planetary gears 361, 362, 363, and 364 using an individual sun gear 365.

Certain embodiments described above show a gear system positioned on the one side of the soil aeration apparatus. Other embodiments, however, may include two gear systems—one gear system positioned on each side of the apparatus. For example, one gear system may be positioned on the outer side of one carrier 20 or 120, and a second gear system (substantially mirrored to the first gear system) may be positioned on the outer side of the opposing carrier 22 or 122.

Furthermore, the direction of rotation 68 or 168 and the direction of revolution 28 or 128 are not limited to the embodiments shown in FIGS. 1, 3, 4, 8A-C, 9, and 10. For example, the tines 50 that comprise soil aeration blades may be operated with the direction of rotation 68 or 168 and/or the direction of revolution 28 or 128 being reversed from what is shown.

Further yet, the gear system may use an engaging member other than a drive chain to engage the gears in the gear system. For example, the engaging member may comprise a cable, belt, linked chain, or the like. Accordingly, the contact surface of the gears may be configured to appropriately engage the selected type of engaging member.

Moreover, the gear system of the soil aeration apparatus may have any number of sun gears, and is not limited to embodiments having one or two sun gears. Accordingly, the gear system may include any number of planetary gears such that each sun gear engages a plurality of planetary gears.

In another embodiment, the soil aeration apparatus may have a non-centrally located support shaft that is positioned concentrically with a tine-holder shaft. In such an embodiment, the tine-holder shaft may be rotatably mounted to the carrier and coupled to a planetary gear while an inner support shaft is fixedly coupled with respect to the opposing carriers. This arrangement of the tine-holder shaft and the non-centrally located support shaft provides support for the soil aeration apparatus. Moreover, because the support shaft is not occupying space outside of the tine-holder shaft, an increased number of tine-holder shafts may be mounted to the carriers. Alternatively, the non-centrally located support shafts may be mounted to the carriers along the outer perimeter of the carriers. For example, in the embodiments where the carriers are circular, the support shafts may be very thin members having a concave surface that matches the curve of the carrier's circumference. This concave surface may be mounted to the carrier along a portion of the circumference such that the non-centrally located support shaft does not occupy a significant amount of area on the opposing faces of the carriers.

Figure 11:
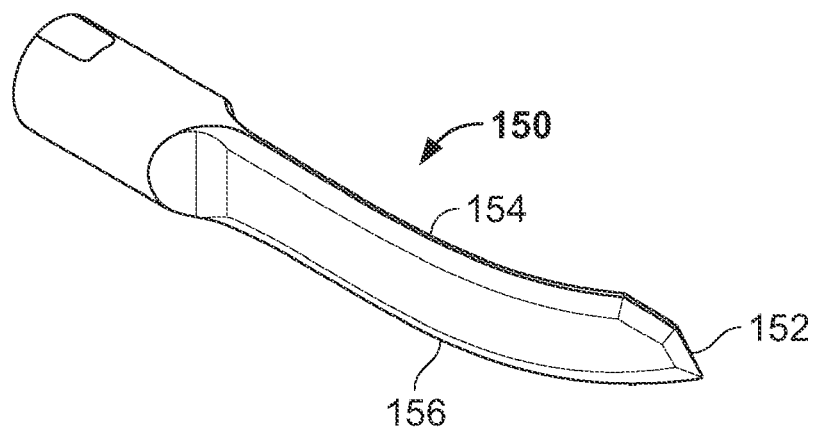
FIG. 11 is a perspective view of an aeration tine that may be used with a soil aeration apparatus in accordance with an embodiment of the invention.
Figure 12A:
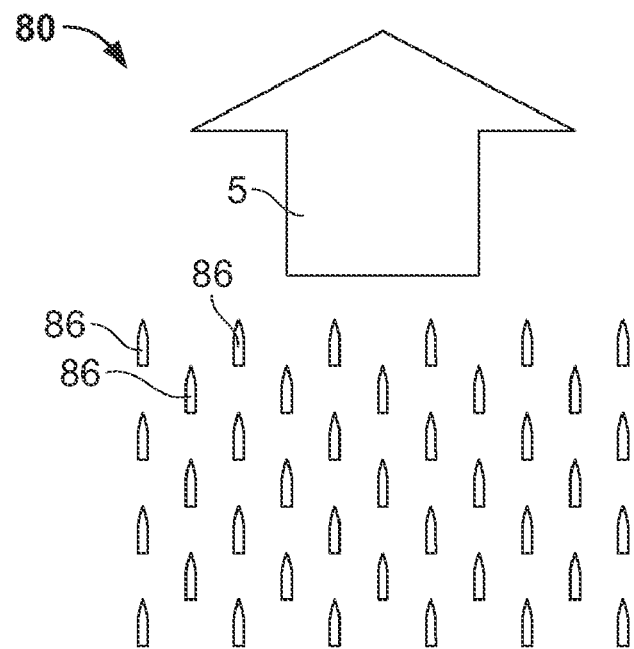
FIGS. 12A-B are top views of ground surfaces having soil aerated in accordance with certain embodiments of the invention.
Figure 12B:
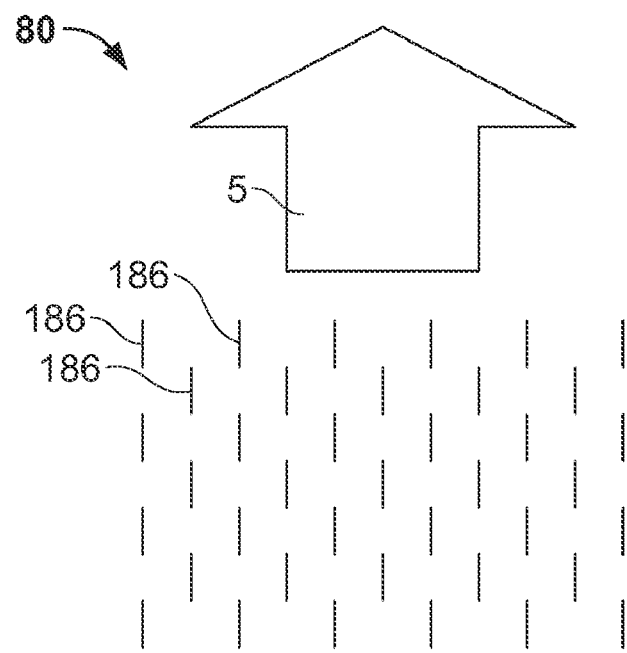

In addition, the soil aeration tines 50 are not limited to the embodiment shown in FIGS. 8A-C. Rather, the tines 50 may various configurations, such as fracturing surfaces, spikes, aeration tubes, aeration blades, or a combination thereof, depending on the soil texture or other factors. Referring to FIG. 11, for example, the tines may include aeration blades 150 that penetrate and cut the soil without necessarily removing a "plug" of soil from the ground. The aeration blade may include a tip 152, a concave edge 154, and a convex edge 156 to penetrate and cut the soil while reducing the amount of soil compaction. As such, the ground surface is not littered with plugs of soil after operation of the soil aeration apparatus. For example, FIGS. 12A-B provide figurative plan views of aerated soil using alternative configurations of aeration tines/blades. In FIG. 12A the soil was aerated using aeration tines 50 (depicted in FIGS. 8A-C). As the soil aeration apparatus moves over the ground surface 80 in a forward direction 5, the tines 50 execute the penetration, sweeping, and plug removal actions described above to form aeration pockets 86. Each row of aeration pockets is staggered with respect to the neighboring rows because the aeration tines 50 were in a staggered position relative to the tines on neighboring shafts (similar to the embodiment shown in FIG. 7B). In FIG. 12B, the soil was aerated using aeration blades 150 (depicted in FIG. 11). The aeration blades 150 form aeration pockets or grooves 186 in the ground surface 80 to aerate the soil as the soil aeration apparatus moves in the forward direction 5. Each row of grooves 186 may be staggered by staggering the position of the blades 150 on neighboring shafts (similar to the embodiment shown in FIG. 7B). Staggering the position of the aeration pockets/grooves (shown in FIGS. 12A and 12B) may increase the perforation density (number of aeration pockets/ slits in a given area) in the aerated soil, thus greatly reducing soil compaction with a single pass of the soil aeration apparatus.

If the rotational velocity of the carrier holding the tine shafts is increased relative to the tractor land speed, the pockets will be located closer together. If desired, the pockets can overlap one another so that each blade forms a continuous slit. If the aeration tines have integral coring tubes, the carrier speed may be selected so that holes made by the coring tubes overlap. Such an implementation would form a relatively wide and continuous slit (approximately as wide as the aeration tube). If the aeration tines are not equipped with an integral coring tube, as shown in FIG. 11, the continuous slit would be narrower, having a width approximately matching that of the aeration tine.

The density of these staggered aeration pockets (i.e. the number of pockets per unit area of turf) is significantly greater than that obtained by conventional systems. In conventional aeration systems, relative to a reference aeration pocket the closest neighboring pocket is typically in line with and at least two tine lengths away from the reference pocket. The staggered tine arrangement of the present invention permits the rows of pockets to be offset relative to one another, increasing the number of pockets per unit area, as shown in FIGS. 12A and 12B.

Moreover, the aeration effect is significantly improved because the pockets are distributed more evenly across the turf by virtue of their staggered arrangement. Conventional systems may produce repeating rows of coring holes having some degree of aeration, but the gap between the rows is not provided any substantial aeration. To the contrary, conventional systems most often compact the soil near the coring site because their tubes are forced directly down into the soil. The system of FIG. 7, however, provides substantially uniform aeration because the resulting aeration pockets are nested together, tightly spaced, and substantially connected by fractures caused by the soil fracturing blades. Air, water and nutrient uptake can thereby be dramatically improved.

Figure 14:
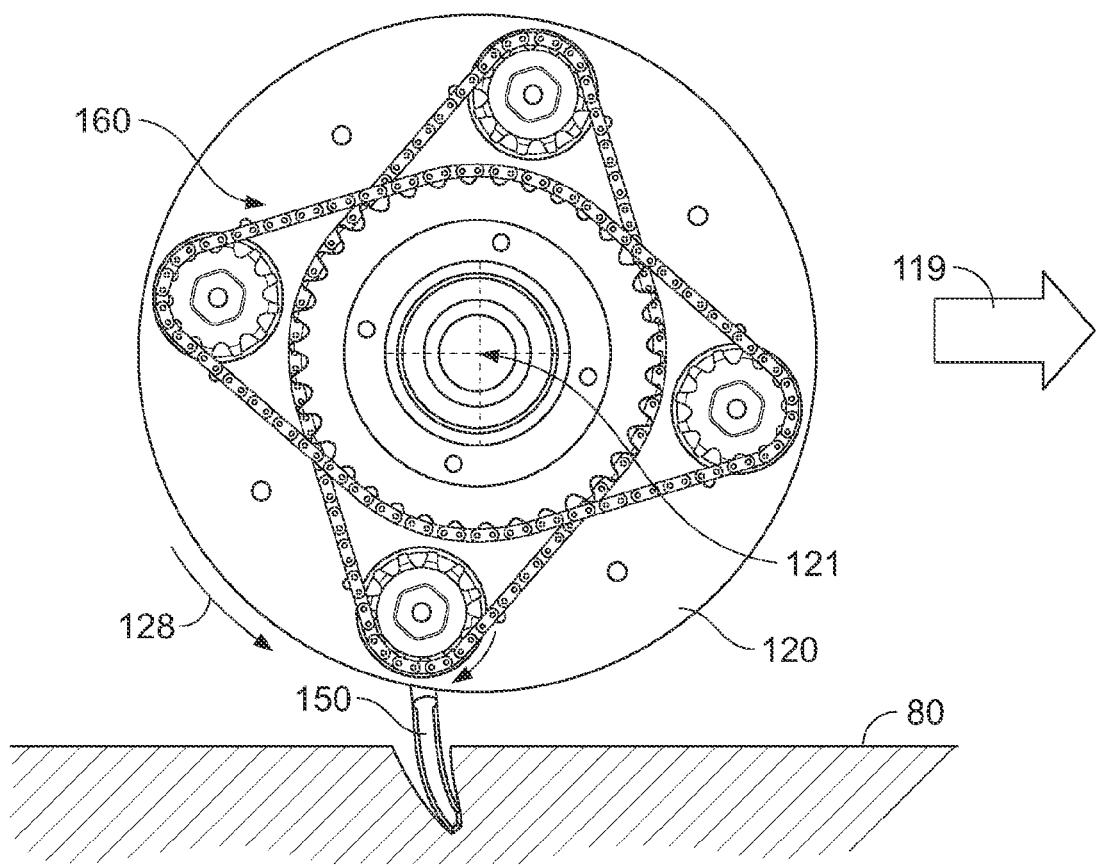
FIG. 14 is a side view of the soil aeration apparatus from FIG. 13 having arcuate tines contacting a ground surface.
Figure 15:
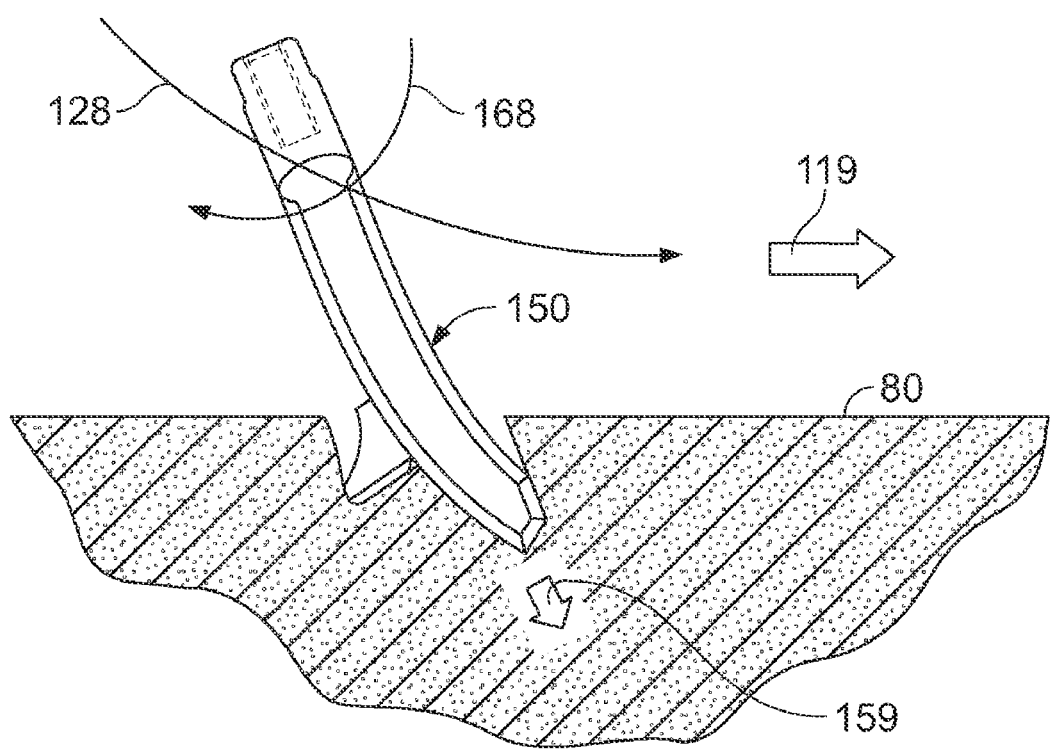
FIG. 15 is a side view of an aeration blade from FIG. 14.

Referring to FIGS. 14-15, the arcuate blades 150 of FIG. 11 may produce a plowshare effect that serves to prevent or reduce undesirable lifting of the soil aeration apparatus from the ground surface as the aeration blades 150 penetrate compacted soil. As shown in FIG. 14, and bearing in mind that the effect of the rotational movement 128 and tractor movement 119 may dominate the effect of the rotation of the arcuate tine on the tine shaft, it can be seen that the leading edge of the 150 leading causes the aerator frame 112 to be drawn downward. As previous described in connection with FIG. 4, the tine-holder shafts revolve about the central axis 121 in the direction 128 as the planetary gear system 160 causes each tine-holder shaft to rotate in the direction 168. The aeration blades 150, which are attached to the tine-holder shafts, undergo a combined motion from the direction of revolution 128 and the direction of rotation 168. The aeration blades 150 initially contact the soil at an acute angle (similar to the soil penetration explain in connection with FIG. 8A) so that the convex edge 156 is positioned generally below the concave edge 154 (refer, for example, to FIG. 15), and then penetrate and fracture the soil to form aeration groves. As the aeration blade 150 penetrates the ground surface 80, the angle and configuration of the blade 150 create a downward force, similar to that of a plowshare as it is forced through topsoil.

Unlike conventional soil aeration systems that require additional weight stacked onto the frame, a three-point hitching system, or a limited number of aeration tines to prevent the apparatus from lifting off the ground surface as the end-coring tines initially penetrated some compacted soil, the plowshare effect of the arcuate blades 150 prevents or reduces such undesirable lifting. Conventional aerators typically require either significant ballast or a three point hitch system to apply a positive downward force to prevent the aerator from being lifted off the ground as the tines impact and penetrate the ground, both of which are particularly undesirable. Ballast increases the power required to tow the unit over turf, which in turn often necessitates the use of larger, more expensive tractors. If the ballast weight is permanently attached to the unit, transport becomes difficult and expensive. Removable ballast must be stored, handled and installed, which consumes times and almost necessarily involves a risk of injury. Three point hitch systems, on the other hand, are expensive, complicated, and require more time and skill to couple to a towable device. Moreover, three point hitches must be raised off the ground before a turn is made, else the towed device will rip the turf as it swings laterally behind the tractor. This significantly impedes any aeration operation and necessitates the use of substantially straight aeration runs. Lastly, tractors equipped with three point hitches are themselves expensive and large and it is therefore more economical to use equipment that can be towed behind smaller, less expensive tractors.

Thus, a soil aerator having reduced size and reduced weight may operate using a one-point connection to a tractor and without the need for additional weight ballasts added onto the frame to prevent unwanted lifting off from the ground surface. Moreover, the plowshare effect permits a greater number of arcuate blades 150 mounted on an individual tine-holder shaft to contact the ground surface at substantially the same time with little or no lifting of the soil aerator from the ground. For example, twelve or more arcuate blades may be mounted to a tine-holder having a length of approximately three feet and may contact the ground surface at substantially the same time, similar to the embodiment shown in FIG. 4.

Accordingly, in certain embodiments the soil aeration frame 112 (FIGS. 13A and 13B) does not require the application of additional downward force, such as ballast or a three-point hitch system to force the aerator against the ground. Rather, the soil aeration frame 112 may use a one-point connection for attachment to a tractor without the need for additional ballast to be added onto the frame. For example, the one-point connection may be accomplished by connecting one end of a connection shaft 118 to the utility vehicle.

Figure 13A:
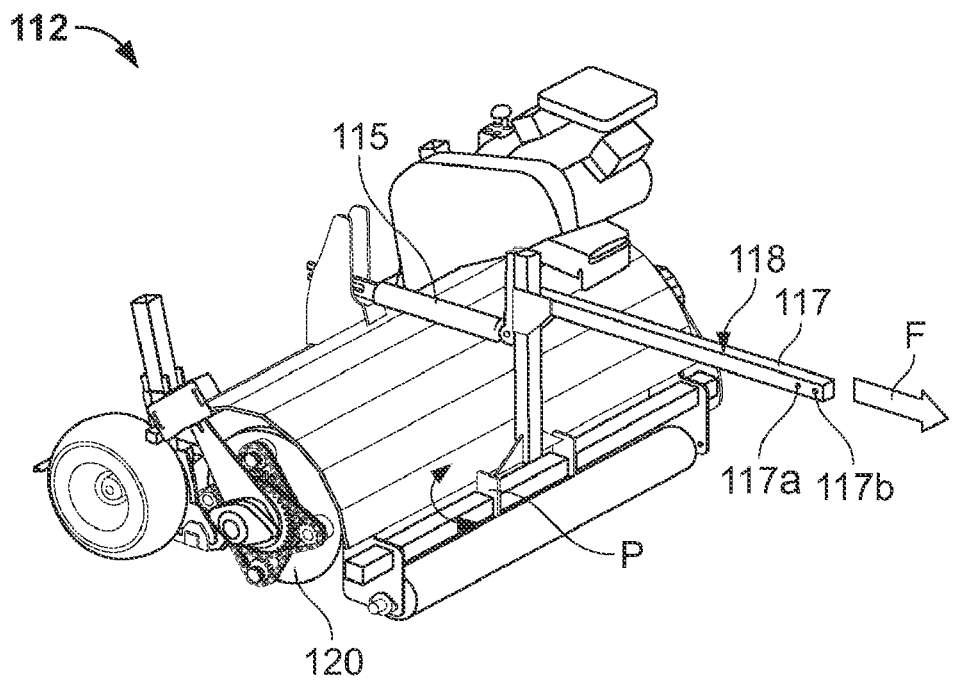
FIG. 13A is a perspective view of the soil aerator frame of FIG. 5, with a side panel removed from the frame to view the soil aeration apparatus.
Figure 13B:
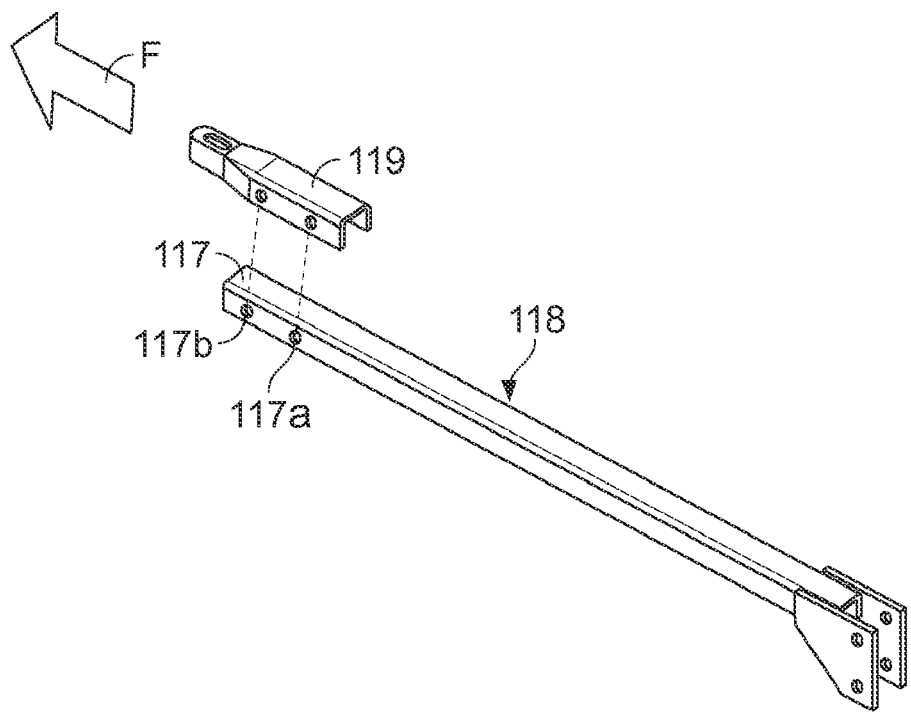
FIG. 13B is a perspective view of a portion of the soil aerator frame of FIG. 13.

As shown in FIG. 13A (and also described previously in FIG. 5), the connection shaft 118 extends from the frame 112 and is connectable to the vehicle at a receiving end 117. The receiving end 117 of the connection shaft 118 may be adapted for insertion into and axially alignment with a complimentary shaft (not shown) on a tractor. When the receiving end 117 is properly inserted, locking pins may be positioned in holes 117a and 117b to maintain that individual portion of the connection shaft 118 in rigid attachment with the utility vehicle. Thus, the soil aeration frame 112 may receive a pulling force F from the tractor via the connection shaft 118. In another example, shown in FIG. 13B, the receiving end 117 of the connection shaft 118 engages a one-point tow hitch 119 that is adapted to connect with a complimentary ball-hitch on the utility vehicle. The tow hitch 119 may be attached to the receiving end using bolts or other fasteners through holes 117a and 117b. In other examples, the receiving end 117 may engage the tractor using a locking-pin/hole assembly, a male-female connector assembly, or the like.

The tine shafts preferably have a length of about three to four feet. There are preferably at least about four tines per foot of tine shaft and if desired there may be provided six, eight, ten or more tines per foot of tine shaft. In residential applications where tractor power requirements and tine replacement costs may be limiting factors, the tine count can be optionally reduced. In various embodiments having increased tine counts, more slender shattering knives with smaller diameter coring tubes may be used. The shattering knives are preferably four to six inches long and have a width of an inch or less. The coring tubes preferably have internal diameters ranging from ¼" to 2", depending on the application. Any number of tine shafts may be provided, limited only by tine clearance requirements. Where variable speed drive motors are used, two or four tine shafts are often sufficient although six, eight, ten or more tine shafts may be desirable in other embodiments with larger carriers, shorter tines and/or different drive means. The sun/planet gear ratio may be varied to adjust the translational and rotational speed of the aeration tine relative to the tractor land speed, with ratios from 1:1 to 10:1 being preferred for most applications, and ratios from 1:1 to 5:1 being most preferred in typical applications. The staggered tine arrangements may include three, four or more discrete tine shaft configurations which may be repeated on successive tine shafts.

Conventional cam driven (or plunger type) aeration devices using coring tubes may not typically be towed at speeds in excess of about 1 mile per hour. At speeds greater than that, the forward motion of the tractor tends to cause the coring tube to tear through the soil in the forward direction before it can be lifted out of the coring hole.

In contrast, however the planetary system described herein can cooperate with the arcuate shape of the aeration tine to form a leading pocket which provides clearance that enables the aerator to be towed at significantly higher speeds without tearing through the soil at the leading edge of the aeration pocket. As shown in FIGS. 14-15, the aeration tine forms a leading pocket as the aeration tine penetrates the soil and rotates in a clockwise direction away from the leading edge of the pocket. These two features separately and synergistically permit the tractor to be operated at higher speeds without the aeration tine tearing through the soil at the leading edge of the pocket. It should be noted that the rotational velocity of the carrier may be increased as tractor speed increase to limit the duration of the tines' aeration sweeps. It has been observed that the planetary aeration system of FIGS. 14-15 can be towed at speeds of five, ten, or even twelve miles per hour in accordance with the foregoing teachings.

A number of embodiments of the invention have been described. Nevertheless, it will be understood that various modifications may be made without departing from the spirit and scope of the invention. Accordingly, other embodiments are within the scope of the following claims.

What is claimed is:

1. A method for forming aeration pockets in a ground surface, comprising:
   towing an aeration apparatus that is mounted to a frame over the ground surface using a tow vehicle, the aeration apparatus including: a central axis, a plurality of curved aeration blades attached to a tine-holder shaft that is offset from the central axis, and a planetary gear system coupled to the tine-holder shaft so as to drive the curved aeration blades in a rotational motion about a shaft axis of the tine-holder shaft and in a revolving motion about the central axis of the aeration apparatus as the curved aeration blades form aeration pockets in the ground surface,
   moving the aeration apparatus over the ground surface at a substantially continuous rate of greater than about five miles-per-hour while at the same time the plurality of curved aeration blades are driven into the ground surface and revolve about the central axis of the aeration apparatus in a direction toward the tow vehicle.

2. The method of claim 1, further comprising connecting the frame to the tow vehicle by a one-point hitch member.

3. The method of claim 1, further comprising causing the curved aeration blades to penetrate the ground surface at a predetermined orientation so as to provide a plowshare effect that urges the frame toward the ground surface as the tow vehicle pulls the aeration apparatus over the ground surface at a substantially continuous rate of greater than about five miles-per-hour 4. The method of claim 1, further comprising forming a plurality of substantially continuous slits in the ground surface while the curved aeration blades are driven in the rotational motion about the tine-holder shaft and in the revolving motion about the central axis of the aeration apparatus.

5. The method of claim 1, wherein each curved aeration blade comprises a convex cutting edge and an oppositely disposed concave edge, the rotational motion of the curved aeration blade about the shaft axis of the tine-holder shaft drives the convex cutting edge to fracture soil during formation of each respective aeration pocket.

6. The method of claim 5, wherein each curved aeration blade forms an aeration pocket by cutting a groove in the ground surface.

7. The method of claim 1, wherein the step of moving comprises moving the aeration apparatus over the ground surface at a substantially continuous rate of about ten miles-per-hour or greater while the plurality of curved aeration blades are driven into the ground surface and revolve about the central axis of the aeration apparatus in a direction toward the tow vehicle during formation of the aeration pockets.

8. A system for forming aeration pockets in a ground surface, comprising:
   an aeration apparatus mounted to a frame such that the frame is operable to transport the aeration apparatus over the ground surface in a forward direction, the aeration apparatus having a central axis and a plurality of curved aeration blades attached to a tine-holder shaft that is offset from the central axis of the aeration apparatus; and
   a planetary gear system coupled to the tine-holder shaft so as to drive the curved aeration blades in a rotational motion about a shaft axis of the tine-holder shaft and in a revolving motion about the central axis of the aeration apparatus as the curved aeration blades form aeration pockets in the ground surface,
   wherein the aeration apparatus is movable over the ground surface in the forward direction at a substantially continuous rate of about five miles-per-hour or greater while the plurality of curved aeration blades revolve about the central axis of the aeration apparatus in the forward direction during penetration into the ground surface to form the aeration pockets in the ground surface.

9. The soil aerator of claim 8, wherein the curved aeration blades penetrate the ground at a predetermined orientation so as to provide a plowshare effect that urges the frame toward the ground surface as the vehicle which transmits a pulling force from the vehicle to the frame.

10. The system of claim 8, wherein the planetary gear system drives the curved aeration blades in the revolving motion about the central axis of the aeration apparatus such that the curved aeration blades revolve about the central axis in a direction toward a towing vehicle connected to the frame while curved aeration blades penetrate into the ground surface and while the aeration apparatus moves over the ground surface at the substantially continuous rate of about ten miles-per-hour or greater.

11. The system of claim 8, wherein the frame is connectable to a tow vehicle by a one-point hitch member.

12. The system of claim 11, wherein the frame and the aeration apparatus is towable by the vehicle at the substantially continuous rate of about ten miles-per-hour or greater during operation while the plurality of curved aeration blades are driven into the ground surface and revolve about the central axis of the aeration apparatus in a direction toward the tow vehicle during formation of the aeration pockets.

13. The system of claim 8, wherein the aeration apparatus forms a plurality of substantially continuous slits in the ground surface when the plurality of curved aeration blades form the aeration pockets in the ground surface.

14. The system of claim 8, wherein each curved aeration blade comprises a blade portion having a convex cutting edge and an oppositely dispose concave cutting edge, the rotational motion of the curved aeration blade about the shaft axis the tine-holder shaft drives the convex cutting edge to fracture soil during formation of each respective aeration pocket.

15. The system of claim 8, wherein each curved aeration blade forms an aeration pocket by cutting a groove in the ground surface.

* * * * *